(12) United States Patent
Sasatani et al.

(10) Patent No.: US 11,783,706 B2
(45) Date of Patent: Oct. 10, 2023

(54) DYNAMIC LANE ADJUSTMENT FOR MULTIPURPOSE ROADWAY ZONES

(71) Applicant: International Business Machines Corporation, Armonk, NY (US)

(72) Inventors: Yohkichi Sasatani, Yokohama (JP); Takeshi Watanabe, Kawasaki (JP); Sanehiro Furuichi, Setagaya-ku (JP); Tsend Ochir Bat Ulzii, Edogawa-ku (JP)

(73) Assignee: International Business Machines Corporation, Armonk, NY (US)

( * ) Notice: Subject to any disclaimer, the term of this patent is extended or adjusted under 35 U.S.C. 154(b) by 65 days.

(21) Appl. No.: 17/526,603

(22) Filed: Nov. 15, 2021

(65) Prior Publication Data

US 2023/0154320 A1    May 18, 2023

(51) Int. Cl.
*G08G 1/09* (2006.01)
*G05D 1/02* (2020.01)
(Continued)

(52) U.S. Cl.
CPC ... *G08G 1/096725* (2013.01); *B60W 60/0011* (2020.02); *G05D 1/0214* (2013.01);
(Continued)

(58) Field of Classification Search
CPC ........ G08G 1/096725; B60W 60/0011; B60W 2520/10; B60W 2520/12;
(Continued)

(56) References Cited

U.S. PATENT DOCUMENTS

2017/0287337 A1    10/2017 Chen
2017/0371337 A1*   12/2017 Ramasamy ............ G08G 1/056
(Continued)

FOREIGN PATENT DOCUMENTS

CN    108510771 A    9/2018
CN    110619752 A    12/2019
(Continued)

OTHER PUBLICATIONS

"Dynamic Traffic Management using Augmented Reality", IP.com No. IPCOM000265371D, IP.com Electronic Publication Date: Apr. 2, 2021, 5 pps., <https://priorart.ip.com/IPCOM/000265371>.
(Continued)

*Primary Examiner* — Rodney A Butler
(74) *Attorney, Agent, or Firm* — Aaron N. Pontikos

(57) ABSTRACT

The method provides for one or more processors to receive traffic information and passing vehicle information associated with a portion of a roadway in which a passing vehicle approaches and travels through the portion of the roadway. The one or more processors predict travel positions of passing vehicles, based on the traffic information and passing vehicle information. The one or more processors determine an impossible space within an existing lane of the roadway and create virtual lane definitions based on the predicting and the traffic information, in which the lane definitions include an optimum number of lanes, a width of respective lanes, and a lane type, and the one or more processors transmit the lane definitions to the passing vehicles based on a correspondence between a type and width of a respective vehicle and the type and width of respective lane definitions.

17 Claims, 3 Drawing Sheets

(51) Int. Cl.
  *B60W 60/00* (2020.01)
  *G08G 1/0967* (2006.01)
(52) U.S. Cl.
  CPC ..... *B60W 2520/10* (2013.01); *B60W 2520/12* (2013.01); *B60W 2530/201* (2020.02); *B60W 2552/05* (2020.02); *B60W 2552/10* (2020.02); *B60W 2554/20* (2020.02)
(58) Field of Classification Search
  CPC ....... B60W 2530/201; B60W 2552/05; B60W 2552/10; B60W 2554/20; G05D 1/0214
  See application file for complete search history.

(56) References Cited

U.S. PATENT DOCUMENTS

| | | |
|---|---|---|
| 2018/0033296 A1 | 2/2018 | Fowe |
| 2018/0075751 A1 | 3/2018 | Bostick |
| 2018/0165954 A1 | 6/2018 | Song |
| 2019/0061765 A1 | 2/2019 | Marden |
| 2019/0276017 A1 | 9/2019 | Hardy |
| 2020/0003577 A1 | 1/2020 | Kline |
| 2020/0082793 A1 | 3/2020 | Ichinokawa |
| 2020/0124423 A1 | 4/2020 | Jiang |

FOREIGN PATENT DOCUMENTS

| | | |
|---|---|---|
| CN | 110888432 A | 3/2020 |
| CN | 111076732 A | 4/2020 |
| CN | 111788104 A | 10/2020 |
| CN | 113104038 A | 7/2021 |
| JP | 2010079449 A | 4/2010 |
| JP | 2017220090 A | 12/2017 |
| JP | 2019511440 A | 4/2019 |
| JP | 2019519048 A | 7/2019 |

OTHER PUBLICATIONS

"Method and system for directing traffic flow and drop off points", IP.com No. IPCOM000254126D, IP.com Electronic Publication Date: Jun. 4, 2018, 4 pps., <https://priorart.ip.com/IPCOM/000254126>.

Mahdawy et al., "Path Planning for Autonomous Vehicles with Dynamic Lane Mapping and Obstacle Avoidance", DOI: 10.5220/0010342704310438, In Proceedings of the 13th International Conference on Agents and Artificial Intelligence (ICAART 2021)—vol. 1, pp. 431-438 ISBN: 978-989-758-484-8, <https://www.scitepress.org/Papers/2021/103427/103427.pdf>.

International Search Report and Written Opinion dated Dec. 27, 22 from International Application No. PCT/CN2022/129951, 9 pps.

* cited by examiner

DYNAMIC LANE ADJUSTMENT FOR MULTIPURPOSE ROADWAY ZONES

BACKGROUND

The present invention relates to autonomous vehicle travel, and more specifically, to dynamically adjusting and communicating roadway lane definitions to optimize the traffic flow of autonomous vehicles.

In many locations, the organization and control of vehicle traffic relies on physically designating fixed lane markings for traffic in a specific direction. The physically designated lanes are shared by all types of vehicles, and smooth traffic flow relies on avoidance of slow or stopped vehicles and consistency of vehicle speed. Physically marked traffic lanes often include generous widths that can accommodate a vehicle in motion moving past a roadside stopped vehicle or another object without significantly violating lane markings.

Autonomous vehicles receive guidance input enabling determination of a respective vehicle's location, navigation, and speed. Vehicle speed and location can be accurately measured using global positioning system (GPS) data, and roadside sensor equipment, as well as autonomous vehicle sensors, can provide a source of vehicle traffic data and history, such as data from traffic analysis and prediction services, and navigation device data sources.

A vehicle profile may include information about respective vehicles, such as function (e.g., passenger, commercial load carrier, public transportation), type (e.g., car, bus, delivery truck, emergency vehicle, 2 wheeled vehicle), size (e.g., vehicle width, length, height), range of speed (e.g., low-speed, higher-speed).

SUMMARY

According to an embodiment of the present invention, a computer-implemented method, a computer program product, and a system for dynamically defining roadway lanes. The method provides for one or more processors to receive traffic information and passing vehicle information associated with a portion of a roadway in which a passing vehicle approaches and travels through the portion of the roadway. The one or more processors predict travel positions of passing vehicles, based on the traffic information and passing vehicle information. The one or more processors determine one or more lane definitions based on the predicting, wherein the lane definitions include an optimum number of lanes, a width of respective lanes, and a lane type, and the one or more processors transmit the lane definitions to the passing vehicles based on a correspondence between a type and width of a respective vehicle and the type and width of respective lane definitions.

DETAILED DESCRIPTION

Figure 1:
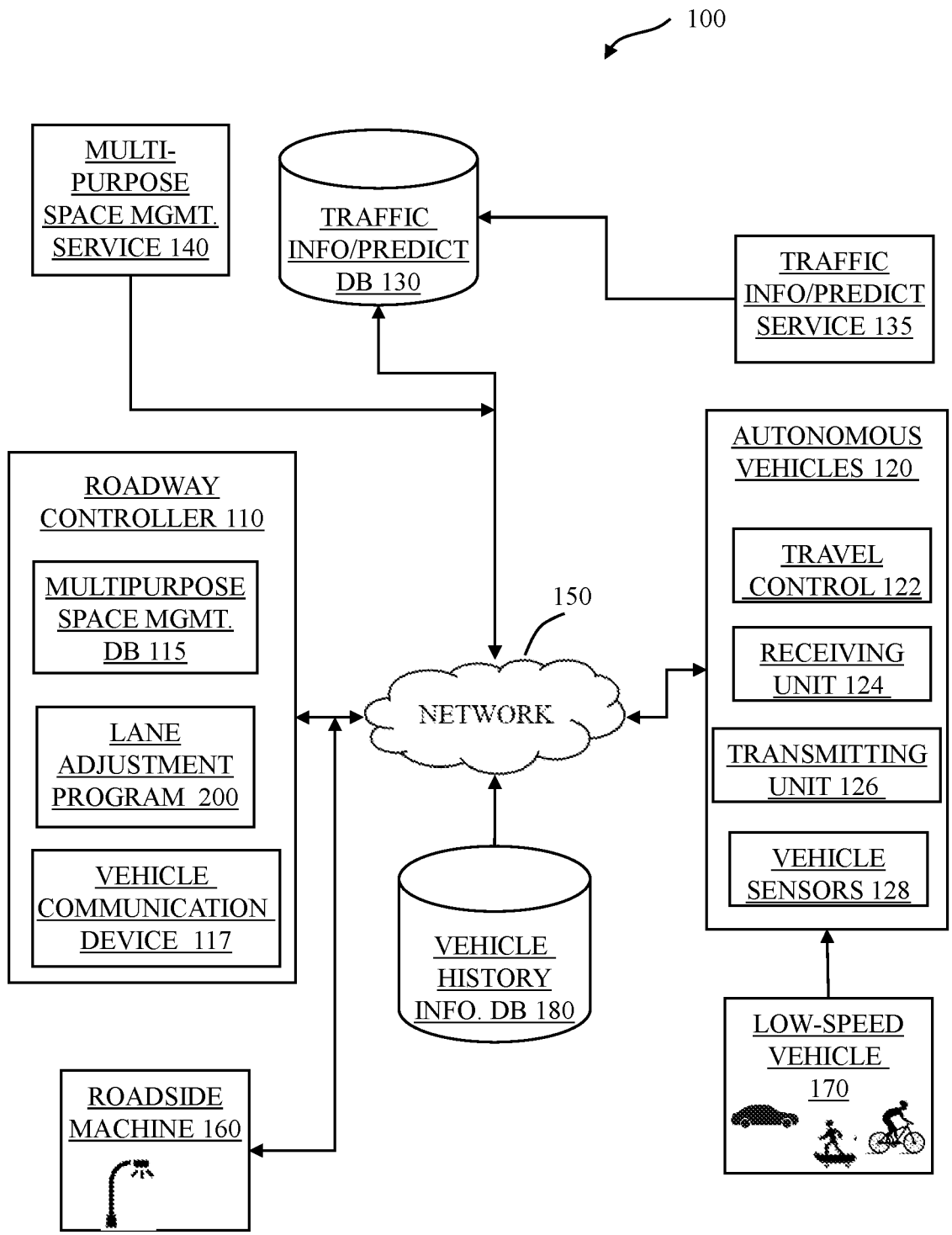
FIG. 1 is a functional block diagram illustrating a distributed data processing environment, in accordance with an embodiment of the present invention.

Embodiments of the present invention recognize that roadway designs and plans accommodate a determined volume of traffic flow and are organized by physically marked lanes for each direction of travel (i.e., painted lane markings). Once physically marked, making changes to the number, size, and purposeful usage of roadway lanes becomes extremely difficult. Embodiments recognize that vehicle stoppage, low-speed vehicles, and pedestrian activity in or near roadway lanes can adversely affect the smooth flow of vehicle traffic, and physically designated lanes can result in poor utilization of roadways with low levels of traffic.

Embodiments of the present invention recognize that autonomous vehicles will become a predominant mode of personal motorized transportation in certain regions. Fully autonomous vehicles won't require fixed lane markings to designate roadway lanes because autonomous vehicles travel and navigate by receiving position information and can also receive virtual lane definitions in which to travel. Accurate positioning of autonomous vehicles within virtual lanes can be accomplished by the use of global positioning systems (GPS), magnetic markers or electromagnetic induction devices, simultaneous localization and mapping (SLAM) using light detection and ranging (LiDAR), or other sensors, and inter-vehicle coordination communications.

Embodiments also recognize that temporary obstruction of a lane of a roadway can result in vehicles being unable to change lanes in a timely manner to avoid the impact of the obstruction and induce traffic congestion, leading to delays and accidents. Some studies of drivers and driving conditions conclude that high-congestion traffic conditions produce greater levels of driver stress and aggressive behavior, leading to road rage and other risk-inducing reactions.

Embodiments of the present invention provide a computer-implemented method, computer program product, and computer system for generating a dynamic lane definition of roadway lanes that includes changes to the number, width, shape (i.e., path), and properties of roadway lanes according to traffic demand and roadway lanes for autonomous vehicles. Embodiments generate the dynamic lane definitions based on the type, the number, size, and speed of autonomous vehicles predicted to pass through a section of a roadway. In an embodiment, existing information services provide vehicle information and traffic information to determine vehicle traffic and detect whether an impassable space exists within a section of roadway in which autonomous vehicles are approaching.

In some embodiments, an impassible space includes a portion of one or more lanes of a roadway in which an obstruction to the smooth flow of traffic exists. In some embodiments, an impassible space obstruction can be caused by a slow-moving (i.e., low speed) vehicle, a parked or stranded vehicle, a stationary object in a lane, and/or pedestrian activity, for example. An impassible space may generate one or more impassible lanes for part of the section of the roadway in which a stationary or slow-moving obstruction occupies one lane of a multi-lane roadway. In some embodiments, a multipurpose space includes a portion of one or more lanes of a roadway used for various activities, such as parking, loading or unloading, delivery, emergency activity, and use by priority vehicles. Priority vehicles may include, for example, emergency response vehicles (i.e., fire engine, ambulance, police, mail delivery). An impassible space may continually change in position, for example, as a low-speed vehicle progresses within a lane on the roadway. The impassible space includes an impassible time that includes an active time range in which the impassible space exists and presents an obstruction to traffic flow.

In some embodiments of the present invention, a lane adjustment program (i.e., lane adjustment program 200, discussed in detail below) predicts the autonomous vehicles (referred to hereafter simply as a/the vehicle(s) unless otherwise designated) that are anticipated as passing through the section of roadway that includes a detected impassible space, also referred to as "passing vehicles." The lane adjustment program determines the passing vehicle prediction based on received traffic and vehicle information, which may be provided by a service, sensors and cameras, and transmissions from vehicles using the particular roadway. If detection of an impassible space occurs, then the lane adjustment program performs analysis on the impassible space and the approaching passing vehicles, and dynamically generates and transmits lane definition information to the approaching passing vehicles. The lane definition information adjusts to the available roadway space corresponding to the impassible space and provides lane change information to accommodate smooth traffic flow of passing vehicles avoiding the impassible space and corresponding to the type, size, and speed of the respective passing vehicle.

In some embodiments, the lane adjustment program enables partial use of roadway lanes for multipurpose space, such as for parking, delivery, public transportation pickup/drop-off, pedestrian activity, and mobile commerce (i.e., food truck). As a result of determining a multipurpose space that includes an obstruction in one or more lanes, the lane adjustment program determines the size (i.e., width) of the obstruction and determines the remaining roadway width available. The lane adjustment program dynamically generates lane definition information that includes the width, number, and properties of virtual lanes comprising the available roadway width and transmits the information to passing vehicles prior to approaching the section of the roadway corresponding to one or more lanes designated as impassable space. The passing vehicles receive the dynamic lane definition information and apply the information to respective automatic driving control functions. The dynamic lane definition information includes lane width definition, maximum speeds designated for respective lanes, and properties, such as designating priority vehicles, low-speed vehicles, two-wheeled vehicles, or vehicles with other attributes to specific virtual lanes. The lane definition information matches vehicle properties (i.e., vehicle width, type, speed, priority) to defined lane properties. In some embodiments, the lane adjustment program monitors the state of lane changes from the dynamic lane definition information for the passing vehicles to determine completion of the lane change designations for the passing vehicles.

In embodiments of the present invention, the transmission of the dynamically generated lane definition information to autonomous vehicles passing through the zone of the roadway that includes the impassible space occurs well in advance of the respective vehicles detecting an impassible space, enabling smooth lane adjustment and vehicle lane changes in advance of the impassible space obstruction. In some embodiments, as the vehicle approaches the impassable space, the front window of the vehicle includes a display of an augmented reality (AR) image of the position of the impassable space, notifying the passenger/driver. Additionally, in some embodiments, a roadside machine projects the AR image using projection mapping with the use of laser illumination, indicating the position of the impassable space by providing a polygon image marking the obstruction in the impassable lane.

The present invention will now be described with reference to the Figures. FIG. 1 depicts a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In embodiments of the present invention, FIG. 1 includes roadway controller 110, autonomous vehicle 120, traffic information/prediction database 130, multipurpose space management service 140, and roadside machine 160, and vehicle history information database 180, all interconnected via network 150. FIG. 1 also includes traffic information/prediction service 135 and low-speed vehicles 170 detected by vehicle sensors 128.

Roadway controller 110 includes multipurpose space management database 115, vehicle communication device 117, and lane adjustment program 200. Roadway controller 110, receives information and data from traffic information/prediction database 130, vehicle history information database 180, multipurpose space management service 140 and information from roadside machine 160, communicates with vehicles via vehicle communication device 117, and performs computing functions by execution of lane adjustment program 200.

In some embodiments, roadway controller 110 can be a blade server, a web server, a laptop computer, a desktop computer, a standalone mobile computing device, a smartphone, a tablet computer, or another electronic device or computing system capable of receiving, sending, and processing data. In other embodiments, roadway controller 110 may be a computing device interacting with applications and services hosted and operating in a cloud computing environment. In another embodiment, roadway controller 110 can be a netbook computer, a personal digital assistant (PDA), or other programmable electronic devices capable of receiving data from and communicating with other devices (shown and not shown) in distributed computer processing environment 100, via network 150, as well as performing operations of separation distance program 200. Alternatively, in some embodiments, roadway controller 110 may be communicatively connected to lane adjustment program 200, operating remotely. Roadway controller 110 may include internal and external hardware components, depicted in more detail in FIG. 3.

Multipurpose space management database 115 includes information associated with portions of a roadway that also serve additional purposes, which generate impassible space of the roadway. In some embodiments, multipurpose space management database 115 operates as a component of roadway controller 110, whereas in other embodiments, a communicative connection exists between roadway controller 110 and a remote multipurpose space management database 115 1(not shown).

In some embodiments, multipurpose space management database 115 includes information of a scheduled purpose of a roadway lane space, such as temporary parking or a bus stop that picks up and drops off passengers who may become pedestrians in or near the impassible space. The scheduled multipurpose space of a roadway lane schedules and creates an impassible space with respect to vehicular traffic flow. Additionally, multipurpose space management database 115 may include information regarding roadway space used temporarily for commercial delivery and item pick up at various points of a roadway lane. In some embodiments, multipurpose space management database 115 receives input from multipurpose space management service 140, which manages (i.e., receives and provides information regarding roadway lane usage for purposes other than traffic flow) the scheduling of roadway space for purposes that may create impassable space. In some embodiments, multipurpose space management database 115 receives input regarding unscheduled roadway space usage that generates an impassible space, such as a vehicle accident, roadway damage, or disabled vehicle.

Multipurpose space management service 140 provides information about pre-scheduled space management of roadway lanes to multipurpose space management database 115. In some embodiments, multipurpose space management service 140 receives manual input that includes a position of a roadway space-occupying one or more lanes, and a timeframe scheduling the roadway space as impassable for passing vehicles. In other embodiments, multipurpose space management service 140 receives input indicating unscheduled use of roadway lane space provided by sensor data from autonomous vehicles 120 or other input such as cameras, drone surveillance, etc. Multipurpose space management service 140 defines and/or updates an impassable space, which changes at regular intervals in view of time series predicted positions of low-speed vehicle/emergency priority vehicle, and safety distance and updates multipurpose space management database 115.

Roadway controller 110 includes vehicle communication device 117, which receives information and data from, and sends roadway lane definition instructions to, autonomous vehicles 120. In some embodiments, vehicle communication device 117 receives information and data from traveling autonomous vehicles 120 that indicates the position and speed of low-speed and non-autonomous vehicles, which may include bicycles, motorcycles and scooters, non-autonomous cars and trucks, and low-powered motorized vehicles. In some embodiments, vehicle communication device 117 receives information from autonomous vehicles 120 and transmits the information to vehicle history information database 180 for storage and access by lane adjustment program 200. Vehicle communication device 117 provides communication of lane definition information generated by lane adjustment program 200 to autonomous vehicles 120, enabling efficient use of roadway space to maintain a smooth flow of passing vehicles while avoiding a detected impassible space.

Autonomous vehicles 120 includes one or more autonomous vehicles traveling on a roadway on which roadway controller 110 operates. Autonomous vehicles 120 includes travel control 122, receiving unit 124, transmitting unit 126, and vehicle sensors 128. Autonomous vehicles 120 navigate roadways without continual manual control and adjustment by a human driver (i.e., user). Autonomous vehicles 120 navigate by receiving input from sensors, GPS guidance signals, communication between other vehicles on the immediate roadway, or other control-based transmissions.

Travel control 122 provides physical control of a respective autonomous vehicle, based on the sensor and instruction set received for a given roadway. Receiving unit 124 provides travel control 122 with the received information, instructions, and GPS guidance. For example, receiving unit 124 receives instruction from lane adjustment program 200 to move to an adjacent lane within the next 200 meters of roadway to avoid an impassible space ahead. Transmitting unit 126 transmits information from a respective autonomous vehicle to lane adjustment program 200 operating on roadway controller 110 via network 150, such as sensor data from vehicle sensors 128, or position and speed data of respective autonomous vehicles. Vehicle sensors 128 includes a set of sensors that provide position, speed, and distance information of the autonomous vehicle to other vehicles. The set of sensors may include, for example, cameras, LiDAR detection, and sonar detection capability. In some embodiments, vehicle sensors 128 detect low-speed vehicles on a roadway and transmit information associated with the low-speed vehicles to lane adjustment program 200 operating on roadway controller 110 via transmitting unit 126 and network 150.

Traffic information/prediction database 130 provides time-series data of vehicles approaching, entering, and passing through a portion of a roadway. In some embodiments, traffic information/prediction database 130 includes time-stamped position and speed information of vehicles, as well as information indicating the volume and flow of traffic approaching the portion of the roadway including the location of an impassable space. Traffic information/prediction database 130 feeds traffic and prediction information to lane adjustment program 200 operating on roadway controller 110 and receives information from traffic information/prediction service 135.

In some embodiments, traffic information/prediction database 130 calculates a prediction of the traffic passing through the impassible space (the number and types of the vehicles to pass through the roadway portion that includes the impassable space) within a unit of time. For example, the unit of time may be 2 minutes, which corresponds to the time duration between a current periodical prediction calculation process and the next periodical prediction calculation process. The prediction calculation determines the vehicles predicted to pass through the zone that includes the impassible space. Lane adjustment program 200 analyzes the information received from traffic information and prediction services 135 and generates a traffic prediction for the portion of the roadway that includes the impassible space for each unit time calculated.

Traffic information/prediction service 135 includes various services providing traffic information, such as position and speed of vehicles on a roadway as a function (i.e., snapshot) of time and travel behavior history, which may be obtained by vehicles passing under roadside machines spanning the lanes of the roadway. Expressway companies, navigation service companies, and map service companies provide traffic information/prediction services, for example. Traffic information/prediction service 135 provides information and calculated predictions of traffic position and speeds to traffic information/prediction database 130. Time series data from traffic information/prediction service 135 and traffic information/prediction database 130 enable prediction of positions and speeds of autonomous vehicles 120 as the vehicles approach and pass through the impassible space zone.

Roadside machine 160 receives lane definition information and indicates the multipurpose space by projection mapping. In some embodiments, roadside machine 160 includes a visual projection device and is positioned in a proximity location of a predicted impassible space, such as a bus stop. Roadside machine 160 identifies the impassible spaces to autonomous vehicles 120 by visually projecting a virtual obstacle, no entry mark, or boundary wall outlining the impassible space. In some embodiments, lasers are used to provide the visual projection of a virtual obstacle. The projection by roadside machine 160 visually indicates the impassable space on the roadway by visual projection of walls or bordering barriers and provides a visual alert to autonomous vehicle drivers and passengers.

Additionally, the projections from roadside machine 160 bring an emphasized marking to an event space, such as pedestrian gathering space for pickup or drop off. In some embodiments, roadside machine 160 includes sensors to obtain traffic information from passing vehicles and provides the information to traffic services, such as traffic information/prediction service 135. In some embodiments, roadside machine 160 transmits a viewable augmented reality (AR) image overlayed on the autonomous vehicle view of the impassible space of the roadway. The autonomous vehicle receives the AR image and projects the image on a window of the vehicle by an AR display device (i.e., Heads-Up-Display) of the vehicle facing the impassible space, and may take the form of one or more polygon shapes, for example.

Low-speed vehicles 170 represents various vehicle types that produce an impassible space, which can include cars, trucks, two and three-wheeled low-speed vehicles, bicycles, and pedestrians traveling in a lane of the roadway. Low-speed vehicles 170 includes all types of vehicles traveling at significantly lower speeds than other traffic vehicles and produce traffic congestion due to vehicle speed reduction and lane changes of other vehicles approaching and traveling in the proximity of low-speed vehicles 170.

Vehicle history information database 180 provides travel history data, which includes information regarding vehicle position, speed, direction, and proximity of other vehicles on the roadway. In some embodiments, vehicle history information database 180 receives input of low-speed or stationary vehicles within a lane of the roadway from sensors of nearby vehicles, such as from cameras or LiDAR sensors on the nearby vehicles. In some embodiments, vehicle history information database 180 provides input to a traffic information analysis/prediction module of lane adjustment program 200 (not shown). The information from vehicle history information database 180 enables lane adjustment program 200 to determine impassible space on the roadway and analyze lane adjustments for autonomous vehicles approaching the impassible space zone on the roadway.

In some embodiments of the present invention, lane adjustment program 200 determines the connected autonomous vehicle type (2 wheeled, bus, delivery truck, emergency vehicle, non-motorized vehicle, etc.) by accessing or receiving vehicle identification and specification information. In some embodiments, an asset registration database (not shown) includes vehicle information, such as vehicle type, width, length, and operating speed range. Lane adjustment program 200 can query the vehicle information from the asset registration database or from information sent from the autonomous vehicles, which may include vehicle specifications along with sending the vehicle information.

In some embodiments in which a non-connected vehicle travels on the roadway with autonomous vehicles 120, the autonomous vehicle sensors 128 on the nearby vehicles can detect the width, height, and position of the non-connected vehicle.

Roadway controller 110 includes lane adjustment program 200, which generates and transmits lane definition information to autonomous vehicles. The lane definition information provides adjustment to the number of roadway lanes, the widths of lanes, and lane properties to achieve smooth traffic flow in portions of the roadway in which an impassible space has been determined. In some embodiments, lane adjustment program 200 determines an impassible space that includes an obstruction, such as a low-speed vehicle, a parked vehicle, a vehicle stopped to drop off and/or pick up passengers, a delivery vehicle, or activity in a lane of the roadway for a planned or unplanned event (e.g., a demonstration march, a vehicle accident). Lane adjustment program 200 determines the remaining roadway lane space other than that occupied by the obstruction within the zone area of the impassible space. In some embodiments, lane adjustment program 200 analyzes the vehicles approaching the impassible space zone, based on information received from traffic information/prediction database 130 and vehicle history information database 180, and adjusts the number and size of lanes in the remaining roadway space. The adjusted lanes include width dimensions to accommodate autonomous vehicles with corresponding width dimensions to navigate the adjusted lanes. Lane adjustment program 200 determines a speed rating for respective adjusted lanes, matching the approaching vehicle speed in some cases and including safety considerations in the impassible space zone.

In some embodiments, lane adjustment program 200 receives information from multipurpose space management database 115 that includes predetermined or pre-planned impassible space in a lane of the roadway positions. The received information identifies the position and timeframe of vehicles scheduled to stop for passenger exchange, delivery, pre-arranged parking, or other activity that creates a lane obstruction. Additionally, lane adjustment program 200 receives information associated with low-speed vehicles and/or unplanned stationary vehicles traveling on the roadway from vehicle history information database 180. The received information from vehicle history information database 180 includes the type of vehicles, the size, and speed of the vehicles, as well as the respective location and lanes occupied by the respective vehicles on the roadway. Lane adjustment program 200 determines lane adjustments to enable smooth flow of the vehicle traffic approaching an impassible space, including generation of virtual lanes with defined widths, speed limits within a lane, and assignment of vehicles within generated lanes, consistent with speed, spacing, and priority status of the vehicle.

Lane adjustment program 200 transmits to travel control 122 component of approaching autonomous vehicles, the lane definition information that includes adjustments of lane width and number as well as assignment of autonomous vehicles to particular lanes, based on time-series information received regarding respective vehicle type, size, and speed. In some embodiments, lane adjustment program 200 transmits information to roadside machine 160 to project AR images within the impassible space for facilitated recognition, for example, by projecting polygon images in the impassible space by laser projection techniques. In some embodiments, lane adjustment program 200 transmits image data associated with the position and size of the impassible space to a display feature of the autonomous vehicles. The display feature of the autonomous vehicle projects the image data on a forward window of the vehicle, for example, providing an augmented reality (AR) image associated with the impassible space (i.e., Heads-Up-Display) along with a notification of the impassible space presented to the driver.

In some embodiments of the present invention, lane adjustment program 200 determines the lane change adjustments as completed when the number of vehicles traveling past the current effective impassible space and the number of vehicles traveling through the impassible space lane (i.e., impassible lane) are both zero. Lane adjustment program 200 monitors the impassible space and records the number of vehicles traveling within the current effective impassible space, the number of vehicles traveling through the impassible lane, and a lane change state. In some embodiments, an impassible space monitoring module (not shown in FIG. 1) provides monitoring of the impassible space and records the entries in multipurpose space management database 115. In other embodiments, the impassible space monitoring module of lane adjustment program 200 records the vehicle number entries in a lane definition information database (not shown).

In some embodiments of the present invention, lane adjustment program 200 includes module components (i.e., units) that perform designated functions within lane adjustment program 200 (individual modules not shown in figures). For example, a traffic information analysis/prediction module determines impassible spaces on the roadway and determines autonomous vehicles approaching the zone that includes the impassible space. An impassible space definition module receives pre-determined schedules and locations of low-speed or stationary vehicles, such as bus stops, delivery schedules, designated parking areas, and scheduled events. The impassible space definition module provides input for determining vehicle lane adjustments to avoid the impassible space. A lane definition module receives traffic analysis/prediction information, impassible space definitions, and vehicle history information and determines the available lane space and approaching vehicle lane requirements. The lane definition module provides the lane adjustment instructions for lane adjustment program 200 to transmit to autonomous vehicles approaching the impassible space. An impassible space monitoring module tracks the number of vehicles traveling within the current effective impassible space and through the impassible lane of the impassible space. In some embodiments, the impassible space monitoring module records the vehicle numbers and a lane change state for the impassible space.

In some embodiments, lane adjustment program 200 includes an impassible space definition module which determines an impassible space and updates the information associated with the impassible space at regular intervals based on time series predicted positions of low-speed vehicles, or priority vehicles (i.e., change in vehicle position as a function of time, based on detected speeds of vehicles). In some embodiments, based on the information received regarding the vehicles and/or conditions creating the impassible space, the impassible space definition module selects an effective space defining the obstruction with one or more lanes of the roadway during a configurable and repetitive time period, such as from execution of a current process period to a next process period.

Embodiments of the present invention include input accessed from high-definition map sources (not shown). Various sensors, cameras, and light detection and ranging (LiDAR) devices, among other measurement tools and methods, provide accurate measurement for generation and update of high-definition (HD) maps. The HD map details provide highly accurate shapes and dimensions of roads, lanes, road shoulders, road-side objects, and details of exit and entrance ramps, which are relied on by autonomous vehicles. Embodiments of the present invention apply the accurate road shape and lane dimension information for defining impassible spaces and calculating potential virtual lanes for vehicles passing through an impassible zone. In some embodiments, HD map data are provided in distributable databases, accessible by lane adjustment program 200 as well as autonomous vehicles 120 (FIG. 1). In other embodiments, HD map data are accessible via an application programmable interface (API) provided by an HD map service.

Figure 2:
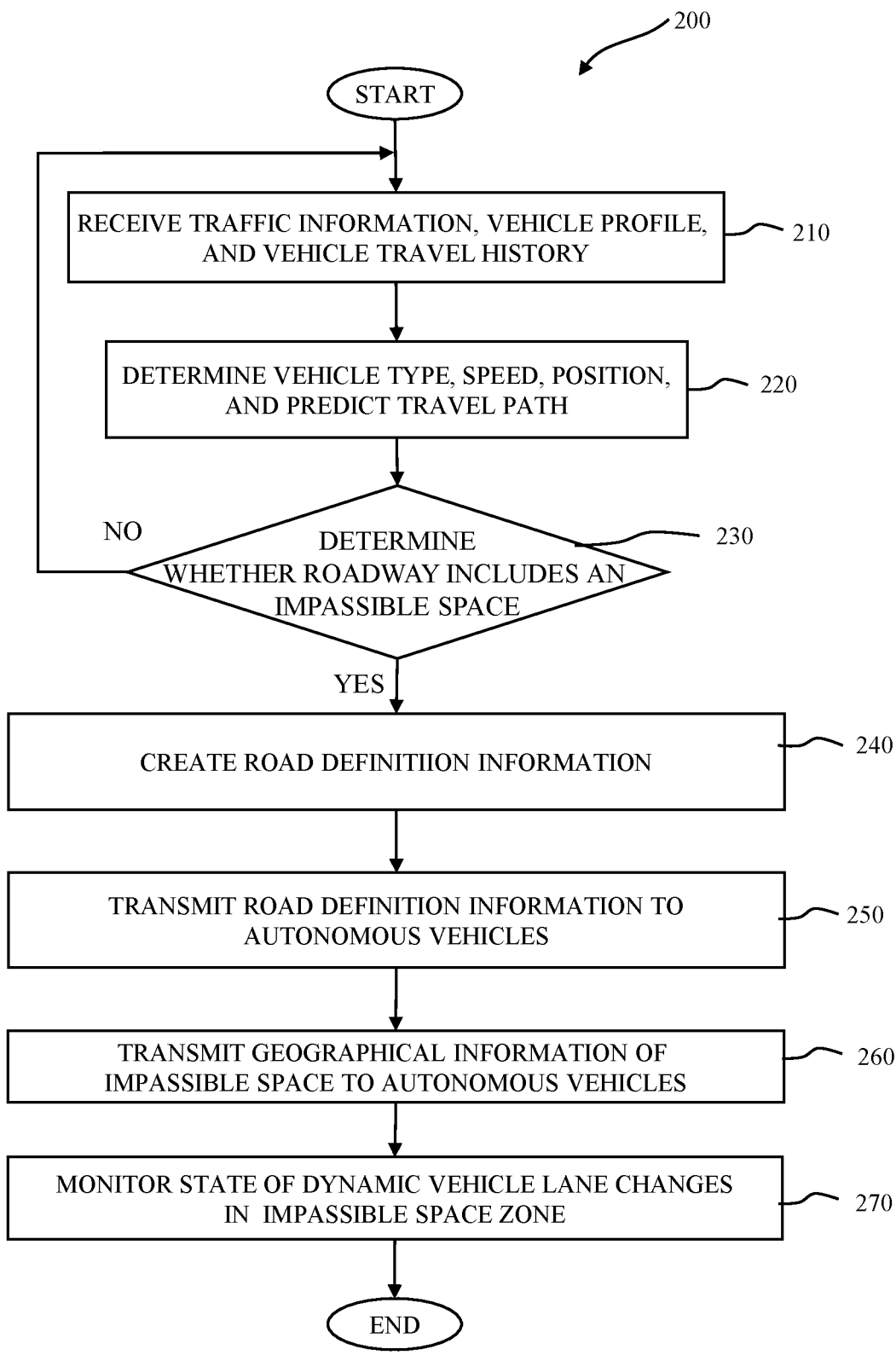
FIG. 2 is a flowchart depicting operational steps of a lane adjustment program, operating in the network of distributed data processing environment of FIG. 1, in accordance with embodiments of the present invention.

FIG. 2 illustrates operational steps of lane adjustment program 200, operating from roadway controller 110, within distributed data processing environment 100 of FIG. 1, in accordance with an embodiment of the present invention. In some embodiments of the present invention, lane adjustment program 200 performs in a periodical process, capturing information of predicted and unpredicted roadway obstructions considered as an impassible space. In the periodical process, lane adjustment program also captures information regarding sets of vehicles approaching the area of the roadway that includes an impassible space, sometimes referred to as a/the impassible zone or impassible space zone. Lane adjustment program 200 repeats the periodic process, which can be configured based on the roadway attributes which, in some embodiments, are obtained by available online HD roadway map and navigation applications, and information from traffic information/prediction service 135 (i.e., path, topography, roadway portion distance, traffic density, vehicle type, and activity).

Lane adjustment program 200 receives traffic information, vehicle profile specifications, and vehicle travel history (step 210). Lane adjustment program 200 receives traffic information from traffic information/prediction database 130, which receives traffic data and calculated traffic position predictions from traffic information/prediction service 135. The traffic information includes current position, speed, and the number of vehicles traveling within a defined portion of a roadway. Lane adjustment program 200 receives vehicle information from vehicle history information database 180. The vehicle history information includes the travel time-series history of speed changes and lane changes of respective autonomous vehicles traveling on the roadway.

Lane adjustment program 200 determines vehicle type, speed, position, and predicts a vehicle travel path (step 220). In some embodiments, lane adjustment program 200 receives vehicle identification and specification information (i.e., profile), which includes the vehicle type, size, and other attributes of the vehicle. In some embodiments, the respective connected autonomous vehicles, such as autonomous vehicles 120, transmit their respective vehicle identification and specification information to lane adjustment program 200, whereas, in other embodiments, lane adjustment program 200 accesses specification information from an asset registration database (not shown), based on identifiers offered by the autonomous vehicle. In some embodiments, based on the vehicle history information and traffic information/prediction, lane adjustment program 200 predicts the path a respective vehicle will take as the vehicle approaches and passes through a particular portion of the roadway.

For example, lane adjustment program 200 determines from vehicle history information of vehicle history information database 180 and traffic information from traffic information/prediction database 130 that a first vehicle has remained in a center lane and maintained a constant speed slightly below the speed limit of the roadway and predicts that the first vehicle will maintain the current lane and speed as it approaches a next portion of the roadway and the next traffic assessment time period. Lane adjustment program 200 also determines that a second vehicle has made several lane changes to pass vehicles that have been traveling at a speed slower than the speed limit, while the second vehicle travels at or slightly above the speed limit. Lane adjustment program 200 predicts that the second vehicle will assume a path with fewer vehicles and maintain a higher speed.

Lane adjustment program 200 determines whether the roadway includes an impassible space (decision step 230). Lane adjustment program 200 determines the presence of an impassible space, based on information of low-speed vehicles received from vehicle history information database 180 and from multipurpose space management database 115 that includes pre-scheduled use of lane space of the roadway that will result in an impassible space. In some embodiments, lane adjustment program 200 receives low-speed vehicle information or stationary vehicle information from autonomous vehicles traveling on the roadway. For the case in which lane adjustment program 200 determines an absence of an impassible space, lane adjustment program 200 returns to step 210 and continues to receive traffic, vehicle, and travel history information.

For the case in which lane adjustment program 200 determines the presence of an impassible space on the roadway, lane adjustment program 200 creates lane definition information (step 240). Lane adjustment program 200 analyzes the received traffic information, the vehicle history information, and includes the roadway path and topography in the analysis performed. Lane adjustment program 200 determines the properties of the impassible space, such as the type of vehicle or obstruction, the speed, the current position, and the time-series predicted position for low-speed vehicles producing the impassible space. Lane adjustment program 200 obtains the roadway width at the location of the impassible space and the remaining passable road width not obstructed by the impassible space and determines the number, type, size, and speed of the autonomous vehicles predicted to pass through the zone of the impassible space. Lane adjustment program 200 determines a lane width required for the vehicles predicted as passing through the impassible space zone, based on vehicle profile data obtained from vehicle history information database 180 or provided directly by transmissions from autonomous vehicles traveling on the roadway and approaching the impassible space zone. Lane adjustment program 200 creates lane definition information that includes generating virtual lanes from the remaining passable roadway space within the zone of the impassible space and assigns a width and speed to respective virtual lanes.

The lane definition information includes a number of lanes and widths of lanes based on dividing the approaching vehicles into groups. For example, lane adjustment program 200 determines that a one-way road width is 14 meters (m) with a determined impassible space occupying 4.5 m, leaving 9.5 m of passable roadway width. Lane adjustment program 200 determines that the approaching passing vehicles can be placed in three groups and directed to virtual lanes with width and speed attributes consistent with the detected speed and width of the approaching autonomous vehicles. In the examples, lane adjustment program 200 designates two virtual lanes at 1.7 m for narrow vehicles and designates one of the narrow lanes at a speed limit of 30 km/h (kilometers per hour) and the other narrow lane designated at a speed limit of 50 km/h. Lane adjustment program 200 designates a third virtual lane with a wider width of 2.6 m and an increased speed limit of 60 km/h, and designates the fourth virtual lane with the widest width at 3.5 m and a speed limit of 60 km/h. Lane adjustment program 200 removes lane option designations to autonomous vehicles that don't meet width or speed features of the virtual lanes, leaving only lane options consistent with the respective vehicle's width and speed capability and history. Lane adjustment program 200 maintains the designation of virtual lanes and lane attributes within the impassible zone, and subsequently removes the lane designations for vehicles having exited the impassible zone.

Lane adjustment program 200 optimizes the number and widths of lanes for accommodating all groups and promoting smooth traffic flow through the impassible space zone. For example, lane adjustment program 200 may consolidate vehicles with similar maximum or sustained speeds into the same lane and may direct vehicles to virtual lanes to reduce the frequency of lane changes through the impassible space zone. In some embodiments, lane adjustment program 200 adjusts the lane properties, based on the lane definitions information, to reduce the speed limit of lanes adjacent to the impassible space as a safety precaution and may define additional virtual lanes away from the impassible lane for traffic at higher speed limits. In some embodiments, lane adjustment program 200 stores the lane definition information in an accessible storage location.

For example, lane adjustment program 200 creates lane definition information that includes defining four virtual lanes with two lanes at a first width and two lanes at a wider second width. The combined widths of the four virtual lanes equal the roadway width remaining after omitting the width of the lane that includes the impassible space. Lane adjustment program 200 sets a reduced speed limit for the virtual first lane adjacent to the impassible space, directs narrower vehicles to the virtual first lane, and directs wider vehicles to the virtual third lane because lane adjustment program 200 has allocated additional width to the virtual third lane. In the example, lane adjustment program 200 directs priority vehicles to the virtual fourth lane and sets speed limits for respective lanes to reduce lane changes through the impassible space zone.

Lane adjustment program 200 transmits lane definition information to autonomous vehicles on the roadway (step 250). Lane adjustment program 200 selects impassible space information and lane definition information for a set of vehicles predicted to pass through the impassible space zone for a particular time-series period, which includes a time range of the set of vehicles currently approaching the impassible space zone to a predicted time when the set of vehicles has passed the impassible space zone. Lane adjustment program 200 modifies the lane definition information on a vehicle-by-vehicle basis and removes lane options for a respective vehicle that has a size, speed, or properties inconsistent with the removed lane options. Lane adjustment program 200 transmit Lane adjustment program 200 transmits the impassible space information and lane definition information, modified for each vehicle of the set of vehicles, to the corresponding traveling vehicles approaching the impassible space zone. A travel control device outfitted in each vehicle of the set of autonomous vehicles receives the transmission of the modified impassible space information and lane definition information. In some embodiments, a vehicle path planner unit receives the lane definition information and provides designated lane and speed information to the vehicle control unit of the respective vehicle. The vehicle control unit adjusts the vehicle path to the lane and speed designations received. The respective traveling vehicles receive the transmissions in advance of reaching the impassible space allowing adequate time to make lane and speed adjustments, and prior to a distance at which the vehicle could otherwise detect the impassible space or the vehicle driver recognize the impassible space.

Lane adjustment program 200 transmits geographical information of the impassible space to the autonomous vehicles (step 260). In some embodiments, lane adjustment program 200 transmits information to the autonomous vehicles approaching the impassible space that includes a geographical depiction of the impassible space and the zone of the lane occupied by the impassible space. Lane adjustment program 200 extracts the geographical information detailing the impassible space from the impassible space information and transmits the geographical information to an AR image generation unit of respective autonomous vehicles passing through the zone area that includes the location of the impassible space. In some embodiments, the AR image generation unit receives the geographical information associated with the impassible space and projects a "no-entry" mark, a blocking image, such as a polygon, or a 3-dimensional object, such as a wall, onto a window display of the respective autonomous vehicles. The displayed blocking image presents an overlaying virtual object in a "heads-up-display" of the autonomous vehicle, visible to the driver/passenger.

Lane adjustment program 200 monitors the state of dynamic vehicle lane changes in the impassible space zone (step 270). Lane adjustment program 200 obtains vehicle profile data and travel history data from vehicle history information database 180, receiving vehicle type, size, maximum speed, position, direction, and identifying surrounding vehicles. Additionally, lane adjustment program 200 obtains continual information of the impassible space, for example, the current position and speed of a low-speed vehicle, or whether a parked or departing delivery vehicle occupies the impassible space.

Having completed a periodic process cycle, lane adjustment program 200 repeats to a new periodic cycle (beginning at step 210) until manually terminated.

Figure 3:
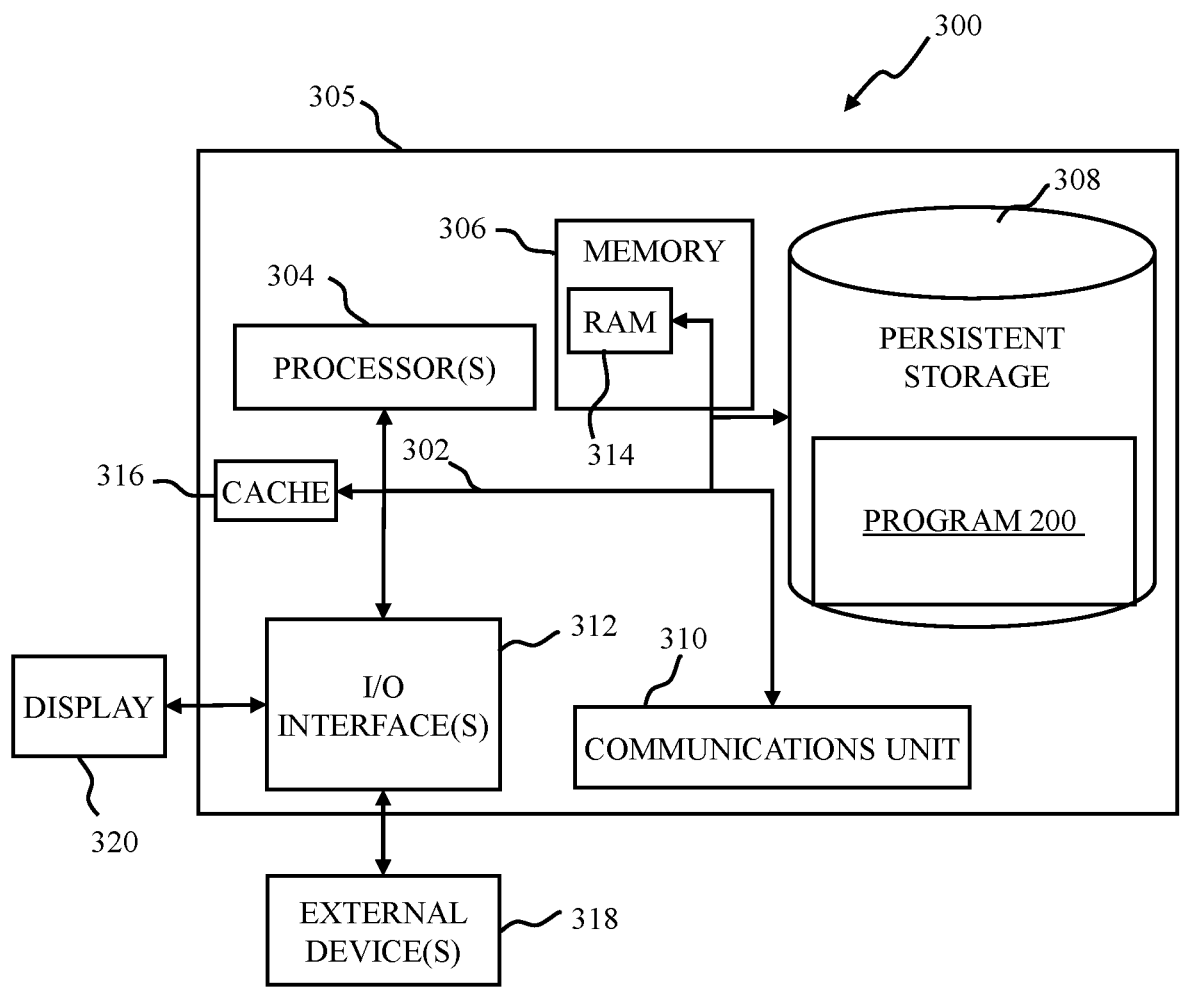
FIG. 3 depicts a block diagram of components of a computing system, including a computing device configured with the capability to operationally perform the lane adjustment program of FIG. 2, in accordance with an embodiment of the present invention.

FIG. 3 depicts a block diagram of components of system 300, which includes computing device 305. Computing device 305 includes components and functional capability similar to roadway controller 110 (FIG. 1), in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 305 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications, and network processors, etc.), system memory, peripheral devices, and any other hardware components within a system. For example, communications fabric 302 can be implemented with one or more buses.

Memory 306, cache memory 316, and persistent storage 308 are computer readable storage media. In this embodiment, memory 306 includes random access memory (RAM) 314. In general, memory 306 can include any suitable volatile or non-volatile computer readable storage media.

Persistent storage 308 includes lane adjustment program 200, enabling execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of distributed data processing environment 100, such as traffic information/prediction database 130, and multipurpose space management service 140. In these examples, communications unit 310 includes one or more network interface cards. Communications unit 310 may provide communications through the use of either or both physical and wireless communications links. Lane adjustment program 200 may be downloaded to persistent storage 308 through communications unit 310.

I/O interface(s) 312 allows for input and output of data with other devices that may be connected to computing system 300. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., lane adjustment program 200, can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for dynamically defining roadway lanes, the method comprising steps of:
    receiving, by one or more processors, traffic information and passing vehicle information associated with a portion of a roadway, wherein the traffic information includes an indication of whether a temporary impassible space exists on the roadway;
    responsive to determining that the temporary impassible space exists on the roadway, visually indicating the temporary impassible space on the roadway at a proximity location of the temporary impassible space by a projection device;

predicting, by the one or more processors, travel positions of passing vehicles, based on the traffic information and the passing vehicle information;

determining, by the one or more processors, lane definitions based on a prediction of the travel positions of the passing vehicles, wherein the lane definitions include an optimum number of lanes, a width of respective lanes, and a lane type; and transmitting, by the one or more processors, the lane definitions to the passing vehicles based on a correspondence between a type and a width of a respective passing vehicle and the type and width of respective lane definitions.

2. The method of claim 1, wherein determining, by the one or more processors, the lane definitions further comprises:

organizing, by the one or more processors, the passing vehicles into groups based on widths and speeds of the passing vehicles; and assigning, by the one or more processors, lanes to respective groups.

3. The method of claim 1, wherein determining the lane definitions further comprises a step of determining an impassable space for the passing vehicles, based on a determined obstruction in a lane of the roadway.

4. The method of claim 1, wherein a type of the passing vehicle includes a speed of the passing vehicle and a priority designation of the vehicle.

5. The method of claim 1, wherein the lane definitions are transmitted to the passing vehicles and direct the passing vehicles, respectively, to a designated lane with the lane type, lane width, and speed corresponding to a respective vehicle of the passing vehicles.

6. The method of claim 1, wherein the lane type includes a designation of a speed limit and a vehicle priority based on vehicle type.

7. The method of claim 1, wherein an impassable space is determined based on a prediction of a position of a vehicle, a speed of the vehicle, and a priority of the vehicle traveling on the roadway.

8. A computer program product for dynamically defining roadway lanes, the computer program product comprising:

one or more computer readable storage media and program instructions stored on the one or more computer readable storage media, the program instructions comprising:

program instructions to receive traffic information and passing vehicle information associated with a portion of a roadway, wherein the traffic information includes an indication of whether a temporary impassable space exists on the roadway;

responsive to determining that the temporary impassable space exists on the roadway, visually indicating, by the one or more processors, the temporary impassable space on the roadway at a proximity location of the temporary impassable space by a projection device;

program instructions to predict travel positions of passing vehicles, based on the traffic information and the passing vehicle information;

program instructions to determine lane definitions based on a prediction of the travel positions of the passing vehicles, wherein the lane definitions include an optimum number of lanes, a width of respective lanes, and a lane type; and program instructions to transmit the lane definitions to the passing vehicles based on a correspondence between a type and a width of a respective passing vehicle and the type and width of respective lane definitions.

9. The computer program product of claim 8, wherein program instructions to determine the lane definitions further comprise:

program instructions to organize the passing vehicles into groups based on widths and speeds of the passing vehicles; and program instructions to assign lanes to respective groups.

10. The computer program product of claim 8, wherein program instructions to determine the lane definitions further comprise:

program instructions to determine an impassable space for the passing vehicles, based on a determined obstruction in a lane of the roadway.

11. The computer program product of claim 8, wherein the lane definitions are transmitted to the passing vehicles and direct the passing vehicles, respectively, to a designated lane with the lane type, lane width, and speed corresponding to a respective vehicle of the passing vehicles.

12. The computer program product of claim 8, wherein the lane type includes a designation of a speed limit and a vehicle priority based on vehicle type.

13. A computer system for dynamically defining roadway lanes, the computer system comprising:

one or more computer processors, one or more computer readable storage media, program instructions stored on the computer readable storage media for execution by at least one of the one or more processors, the program instructions comprising:

program instructions to receive traffic information and passing vehicle information associated with a portion of a roadway, wherein the traffic information includes an indication of whether a temporary impassable space exists on the roadway;

responsive to determining that the temporary impassable space exists on the roadway, visually indicating, by the one or more processors, the temporary impassable space on the roadway at a proximity location of the temporary impassable space by a projection device;

program instructions to predict travel positions of passing vehicles, based on the traffic information and the passing vehicle information;

program instructions to determine lane definitions based on a prediction of the travel positions of the passing vehicles, wherein the lane definitions include an optimum number of lanes, a width of respective lanes, and a lane type; and program instructions to transmit the lane definitions to the passing vehicles based on a correspondence between a type and a width of a respective passing vehicle and the type and width of respective lane definitions.

14. The computer system of claim 13, wherein program instructions to determine the lane definitions further comprise:

program instructions to organize the passing vehicles into groups based on widths and speeds of the passing vehicles; and program instructions to assign lanes to respective groups.

15. The computer system of claim 13, wherein program instructions to determine the lane definitions further comprise:

program instructions to determine an impassable space for the passing vehicles, based on a determined obstruction in a lane of the roadway.

16. The computer system of claim 13, wherein the lane definitions are transmitted to the passing vehicles and direct the passing vehicles, respectively, to a designated lane with the lane type, lane width, and speed corresponding to a respective vehicle of the passing vehicles.

17. The computer system of claim 13, wherein the lane type includes a designation of a speed limit and a vehicle priority based on vehicle type.

* * * * *